(12) United States Patent
Blattner et al.

(10) Patent No.: US 6,880,757 B2
(45) Date of Patent: Apr. 19, 2005

(54) DEVICE AND PROCESS FOR READING OUT IDENTIFICATION INFORMATION ON RETICLES

(75) Inventors: Jakob Blattner, Ermatingen (CH); Rodolfo Federici, Berg (CH); Harald Richter, Constance (DE)

(73) Assignee: Brooks Automation, Inc., Chelmsford, MA (US)

(*) Notice: Subject to any disclaimer, the term of this patent is extended or adjusted under 35 U.S.C. 154(b) by 49 days.

(21) Appl. No.: 10/654,107

(22) Filed: Sep. 3, 2003

(65) Prior Publication Data

US 2004/0089719 A1 May 13, 2004

(30) Foreign Application Priority Data

Sep. 4, 2002 (CH) .............................................. 1505/02

(51) Int. Cl.[7] .................................................. G06K 7/10
(52) U.S. Cl. .................................. 235/462.12; 382/144
(58) Field of Search ........................... 235/454, 462.12; 382/144, 149

(56) References Cited

U.S. PATENT DOCUMENTS

| | | | |
|---|---|---|---|
| 5,663,569 A | 9/1997 | Hayano | 250/559.45 |
| 5,680,200 A | 10/1997 | Sugaya et al. | 355/53 |
| 6,039,254 A | 3/2000 | Froese-Peeck et al. | 235/462.32 |
| 6,190,807 B1 | 2/2001 | Wang et al. | 430/5 |
| 6,201,892 B1 | 3/2001 | Ludlow et al. | 382/149 |
| 6,377,866 B1 | 4/2002 | Iwakiri et al. | 700/121 |
| 6,523,748 B1 * | 2/2003 | Nishikata | 235/462.08 |
| 6,603,874 B1 | 8/2003 | Stern et al. | 382/144 |
| 2003/0026472 A1 * | 2/2003 | Takayuki | 382/144 |
| 2003/0059103 A1 * | 3/2003 | Shiomi et al. | 382/144 |

FOREIGN PATENT DOCUMENTS

| | | |
|---|---|---|
| DE | 41 42 614 | 4/1993 |

* cited by examiner

*Primary Examiner*—Mark Tremblay
(74) *Attorney, Agent, or Firm*—Perman & Green, LLP; Richard Pickreign

(57) ABSTRACT

A device for reading and identifying a plate, with a camera means (100) with an optical device (110; 112, 114)) for digital image recording and an image processing device for the analysis of the image recorded by the camera means (100). In one embodiment, identification codes can be imaged from both sides of the plate (20)* by a mirror means (120; 122, 124, 126) onto the optical device (110; 112, 114) of the camera. The device is designed in such a way that each plate (40) can be recorded with two camera images, wherein a camera image is produced through the arrangement of several mirrors (122, 124, 126) of the mirror means (120) in such a way that one image half represents the right edge and the other image half represents the left edge of the plate (40) over a predetermined length.

31 Claims, 3 Drawing Sheets

DEVICE AND PROCESS FOR READING OUT IDENTIFICATION INFORMATION ON RETICLES

FIELD OF THE INVENTION

The disclosure, drawings and claims herein refer to a device for reading out identification information, especially barcode information, on reticles as well as a process for this. In particular, the disclosure, drawings and claims herein refers to a device with which barcode information on the reticles can be read after an alignment operation.

EARLIER RELATED DEVELOPMENTS

Known from the Patent Application CH 2001 1283/01 of the Applicant is the desire to align a large number of plates—for example, wafer discs or reticles—azimuthally with respect to a marking in order, by means of a camera, to be able to read out identity codes situated in the outer area of the plate. In the following, the present object will be described, without limitation of generality, with reticles, which are understood to refer to, for example, chromium-vapor-deposited photomasks made of glass. Such plates are known, for example, to be square with a dimension of 152 mm. Introduced onto the plates on opposite-lying sides are identifications for the purpose of identification, such as, for example, barcodes. The radial position of the code is not precisely established; it can be, for example, 3–10 mm from the edge. For certain identifications, specific symbols, in addition to the barcode, are present.

For reading out the identification data, a camera and an image processing device (software) are therefore desired. In order to be able to read out the identifications—especially when the position of the identifications are not known or are not precisely known—the camera should be capable of establishing a possible area in which the identification is placed (so-called "area of interest"). In addition, there exists the desire that diverse identifications can be read with high resolution by a camera. An example is intended to make clear what is meant here by high resolution: The possible search area extends in length, for example, over the entire width of the reticle, that is 152×152 mm, namely—possibly—on both edges of the side being regarded. This involves an image resolution of at least 2400 pixels at 0.0625 mm/pixel.

SUMMARY OF THE EXEMPLARY EMBODIMENTS

An object of the exemplary embodiments is to propose a device with which the identifications on the plate can be read out when the identifications are larger than the individual camera image—for example, when the identifications on two edges on one side of the plate, in particular on a reticle, are to be optically recorded and identified or when identifications that are longer than an individual camera image are to be recorded.

The measures of the exemplary embodiments have, first of all, the consequence that, because of the desire for high resolution and the uncertainty of the position of the identifications on the reticle, several images can be recorded. In one aspect of the exemplary embodiments, each side-edge area of the reticle can be recorded with several partial camera images—for example, two or four. To this end, one camera image is produced through an arrangement of several mirrors in such a way that one half of the image represents the right edge and the other half of the image represents the left half of the reticle over a predetermined length. The consequence of this is that each of the image halves focuses on the identification area on the respective reticle edge, even though the edges lie considerably apart. In another aspect of the exemplary embodiments, which can act together with the first one, the partial camera images are recorded in a—time—alternating manner with respect to one another and partially overlap one another. This is accomplished by passing the reticle below the camera. The image analysis device may be provided as software. In this case, the partial camera images, which were recorded with the device in accordance with the exemplary embodiments presented and which display the zones of the respective identification code—preferably the barcode—that overlap in the right and in the left image halves, are processed in a data processing device. On the basis of the imaging ratios and the precisely known recording position of the individual partial camera images, the area of overlap of the individual partial images is roughly known for each reticle edge.

The candidates for an expected identification code—such as a barcode—are processed until a specific code can be analyzed. Depending on the position of the lines, the overlap to be expected between the lines is calculated from the given imaging ratios. Afterwards, the actual overlap is determined in each case through a comparison of the line profiles with one another. If this results in a clear zone of overlap, a weighted combination of the two line profiles is carried out, so that a continuous area of analysis results. For the case that no clear zone of overlap can be recognized, an individual window of analysis results for each area. Subsequently, a code-specific decoding algorithm is applied to the resulting window of analysis. This is carried out in such a way that the respective code-specific start and stop symbols are sought out and the intervening symbols are determined by use of a code table—preferably by use of a barcode table. The identification code determined in this way is then available in the data processing instrument as a reticle identification.

The elements to be used in accordance with the invention, those previously mentioned as well as those claimed and those described in the following examples of embodiment, are not subject to any special exceptional conditions in terms of their size, shape, materials used, and technical conception, so that the selection criteria known in the respective area of application can be used without any limitation.

Furthermore, the device is not fundamentally limited to reticles. Both the device and the process can be used for other articles. Further details, features, and advantages of the object of the exemplary embodiments ensue from the following description of the respective drawings, in which —by way of example—a device and a respective process course are described.

DETAILED DESCRIPTION OF THE EXEMPLARY EMBODIMENTS

Figure 1:
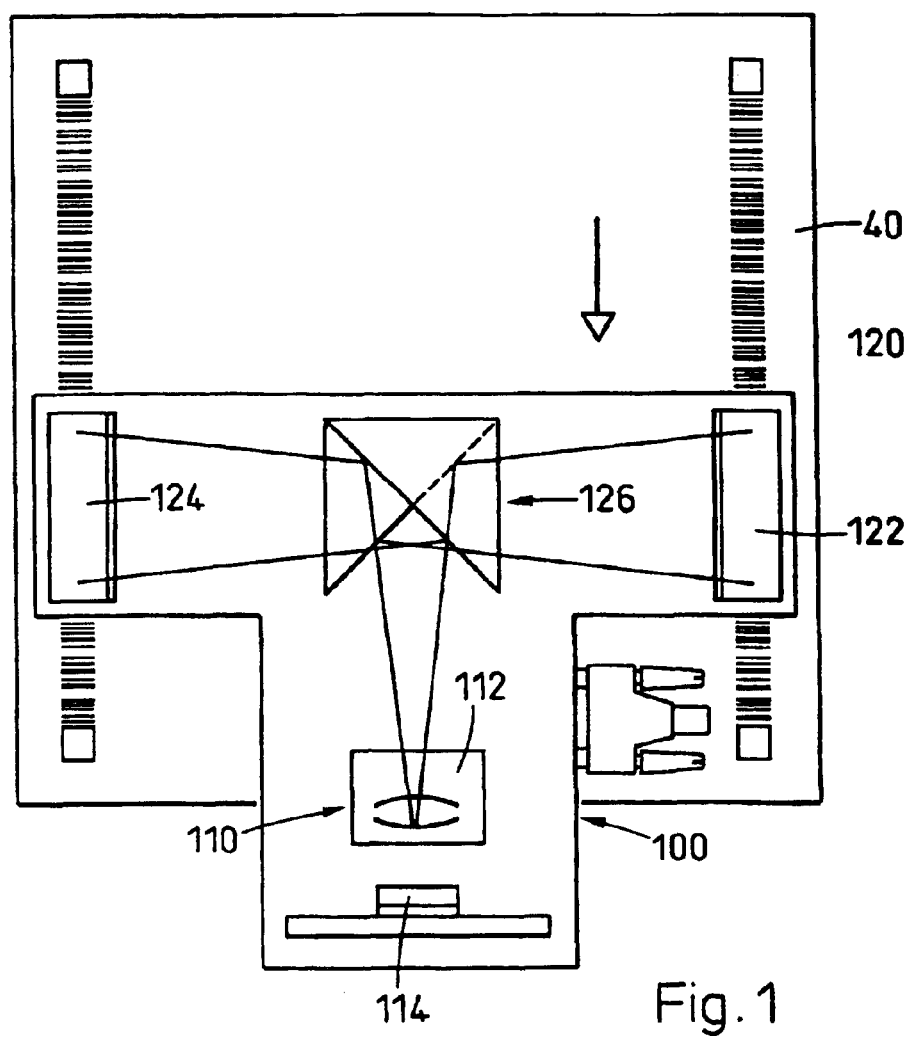
FIG. 1 an arrangement of the camera and of the mirror system as well as a typical reticle in accordance with an exemplary embodiment with the typical path of rays.

Represented in FIG. 1 is an example of embodiment in regard to the present invention, in which the camera, which has a focusing optics 112, records the images of the optical mirror system 120 and conveys these to further data processing. The camera has, in addition, a power supply interface as well as a video graphics interface (VGA).

Here, the reticle 40 to be observed is situated below the camera 114 and its optics 122, 124, 126 and is passed below the camera in the direction given. During its passage, the individual partial camera images are recorded.

The path of rays in accordance with the exemplary embodiment is governed by the mirror system 120, which consists of the two side mirrors 122 and 124 as well as the deviation mirror 126. The object that is to be observed from both sides—as reticle 40 in the present sample embodiment—lies, in the sample embodiment, below the two side mirrors 122 and 124. The two imagings of the reticle 40 are thus projected upwards via the side mirrors 122 and 124 initially onto the deviation mirror. This mirror is shaped in such a way that the image of the left edge, which is projected by the deviation mirror 124 onto the mirror 126, is produced by an upper mirror half on the optics, while the image of the right edge, which is projected by the deviation mirror 122 onto the mirror 126, is produced by a lower mirror half on the optics. Thus, a part of the mirror edge represented from above in FIG. 1 is not visible and is consequently represented by a broken line. The deviation mirror 126 is thus arranged in such a way that the partial images are transmitted in the direction of the camera optics 112 and 114. In the sample embodiment, the image field amounts to approximately 29×20 mm. The camera optics consist of a focusing device 112 and a digital image recording device 114 with an image scanner.

Figure 2:
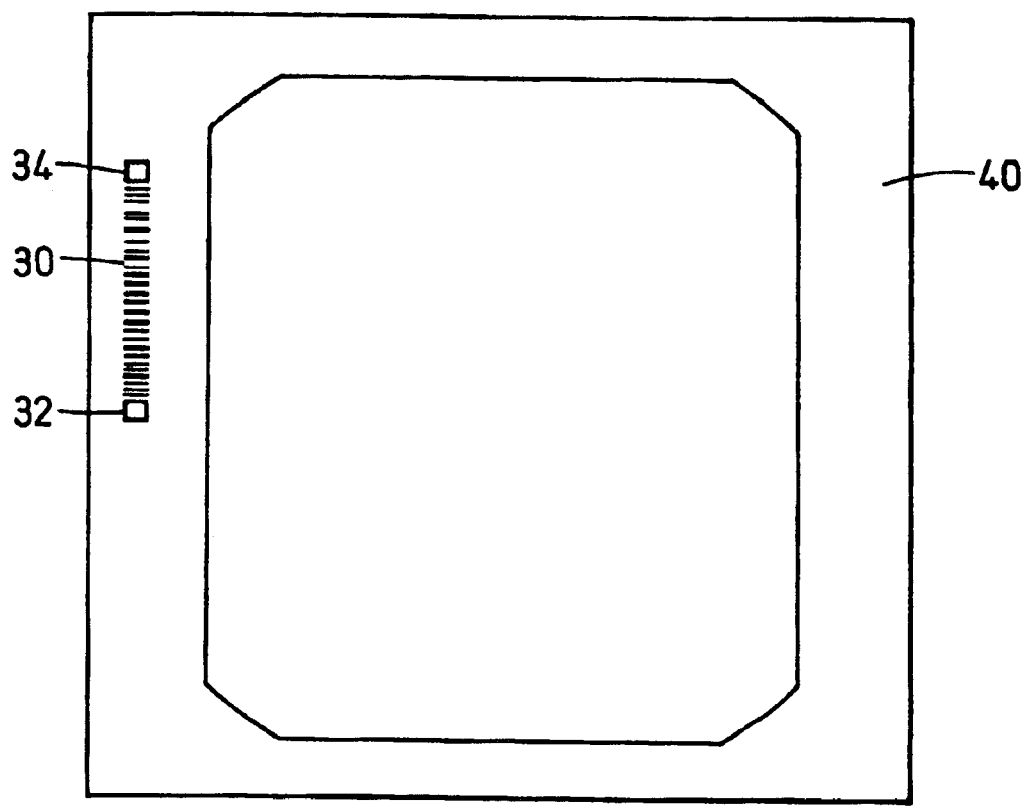
FIG. 2 a representation of a typical first identification code on a reticle for use in the exemplary embodiment.
Figure 3:
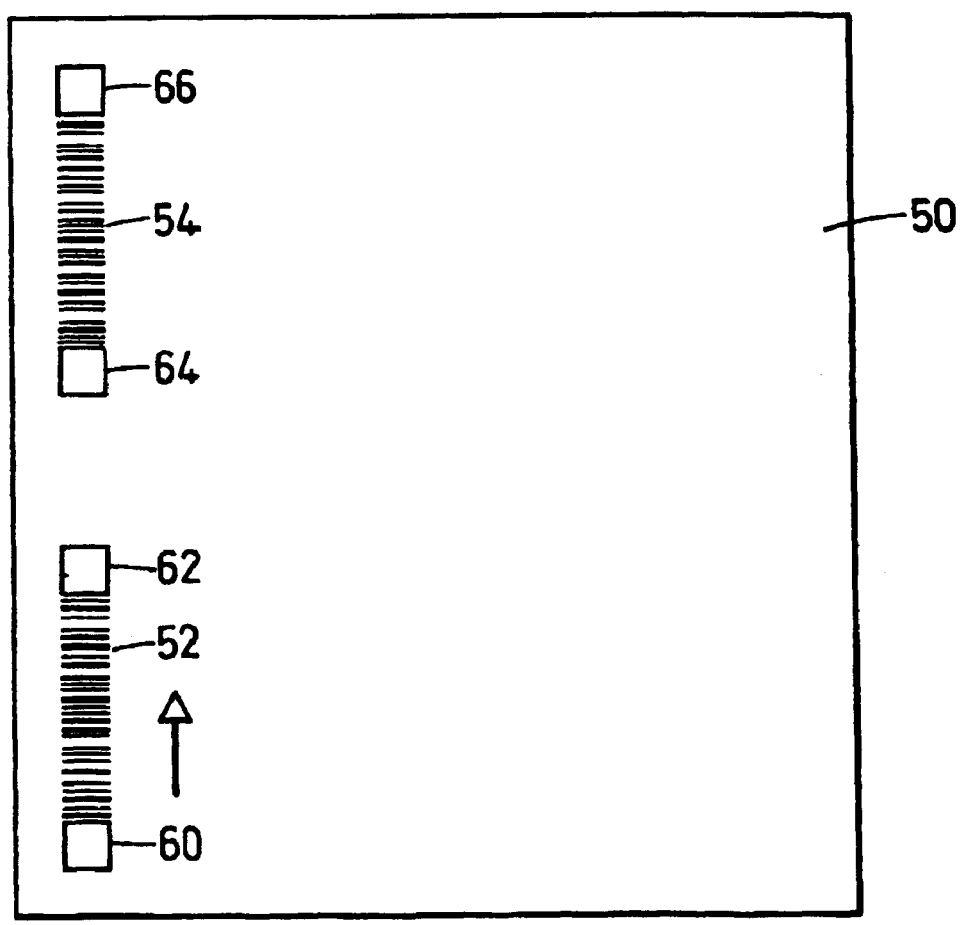
FIG. 3 a representation of a typical second identification code on a reticle for use in the exemplary embodiment.

By way of example, typical identification codes of reticles 40 and 50 are represented in FIG. 2 and FIG. 3. Represented in FIG. 2 is a barcode 30 with a start symbol 32 and a stop symbol 34, which, in accordance with the above-described algorithm, can then be read and decoded. Represented in FIG. 3 is a reticle 50 with two identification codes 52 and 54, each of which displays a start region 60, 64 and an end region 62, 66.

The process in regard to the exemplary embodiment provides—in accordance with the present sample embodiment—that the identification code on the plate 40 is imaged on the optical device 112, 114 of the camera 100. In the process, the plate 40—in the sample embodiment described here—is recorded with two camera partial images in each case. One camera image is produced through the arrangement of several mirrors 122, 124, 126 in such a way that one image half represents the right edge and the other image half represents the left edge of the reticle 40 over a predetermined length, these camera images each being projected initially upward onto the side mirrors 122, 124 and then laterally onto the deviation mirror 126. In the process, a first camera image, which is projected from the first side mirror 124 onto the deviation mirror 126, is imaged by a first mirror half of the deviation mirror 126 forward onto the optics 112, 114, while a second image half, which is projected from the second side mirror 122 onto the deviation mirror 126, is imaged by a second mirror half of the deviation mirror 126 also forward onto the optics 112, 114. Each of the image halves focuses itself on an identification area on the respective plate edge, which is predetermined in terms of length, even when the edges lie considerably apart. The two partial camera images are recorded in an alternating manner—with respect to time and thus also with respect to length owing to the movement of the reticle—and the images partially overlap.

The partial camera images are processed for candidates for an expected identification code until a specific code can be analyzed; depending on the position of the lines, the overlap expected between the lines is calculated from the given imaging ratios and, afterwards, the actual overlap is determined in each case by a comparison of the line profiles with one another. When this results in a clear zone of overlap, a weighted combination of the two line profiles is carried out, so that a continuous area of analysis results. For each area, however, an individual window of analysis is processed if no clear zone of overlap can be recognized. Subsequently, a code-specific decoding algorithm is applied to the resulting window of analysis, with the respective code-specific start and stop symbols being sought out and the intervening symbols being determined by use of a code table.

What is claimed is:

1. A plate identification device for identifying a plate, the plate having an indicia pattern disposed on a predetermined region of the plate, the device comprising:
   an image reader;
   an image processor connected to the image reader for analysis of an image read by the image reader; and
   a mirror connected to the image reader for imaging at least part of the indicia pattern onto the image reader;
   wherein the mirror is disposed so that the image formed by the mirror onto the image reader is a composite image of at least two partial images of different sections of the plate.

2. The device according to claim 1, wherein the different sections of the plate are separate and spaced apart from each other.

3. The device according to claim 1, wherein at least one of the at least two partial images includes at least part of the indicia pattern.

4. The device according to claim 1, wherein the different sections are proximate opposing edges of the plate.

5. The device according to claim 1, wherein the image reader comprises an optical device for digital image recording, the optical device including focusing optics and a digital scanner.

6. The device according to claim 1, wherein the indicia pattern comprises one or more identification codes.

7. The device according to claim 1, wherein the image reader has an imaging area capable of reading images of a predetermined image size, the predetermined region on which the indicia pattern is disposed having a size greater than the predetermined image size.

8. The device according to claim 1, wherein one of the at least two partial images is of a first plate edge, and another of the at least two partial images is of an opposite plate edge relative to the first plate edge.

9. The device according to claim 1, wherein one of the at least two partial images is of a predetermined partial length of one of the different sections of the plate.

10. The device according to claim 9, wherein the predetermined length is less than a length of the indicia pattern distributed on the one of the different sections.

11. The device according to claim 1, wherein the mirror comprises side mirrors and a deviation mirror located in-between the side mirrors.

12. The device according to claim 11, wherein the side mirrors redirect rays from a first direction to a second direction onto the deviation mirror, and the deviation mirror redirects rays from the second direction to a third direction onto the image reader, and wherein a first of the at least two partial images is imaged by one of the side mirrors and another of the at least two partial images is imaged by another of the side mirrors.

13. The device according to claim 12, wherein the side mirrors are substantially parallel to each other, and wherein the second direction is substantially orthogonal to the first direction and the third direction is substantially orthogonal to the second direction.

14. The device according to claim 1, wherein the image reader and the mirror are housed in a camera.

15. The device according to claim 14, further comprising a plate support adapted to allow the plate to be moved relative to the camera so that the camera can image different sections of the predetermined region of the plate.

16. The device according to claim 1, wherein the image reader and mirror are adapted to image the predetermined region in sections, different sectional images of the different sections of the predetermined region being recorded by the image processor, the image processor being programmed to process the different sectional images to identify the indicia pattern on the predetermined region from indicia pattern portions in the different sectional images.

17. The device according to claim 16, wherein the different sectional images overlap each other.

18. The device according to claim 17, wherein the image processor has programming for processing the different sectional images arranged so that the different sectional images are processed for candidates for an expected identification code until a specific code can be analyzed, wherein, depending on a position of indicia in the indicia pattern, an expected overlap between the indicia is calculated from predetermined imaging ratios and, an actual overlap is determined through a comparison of indicia profiles in the different sectional images.

19. The device according to claim 18, wherein the image processor programming is arranged so that, if a clear zone of overlap is determined, a weighted combination of the indicia profiles is carried out so that a continuous area of analysis results, but, when no clear zone of overlap can be recognized, an individual window of analysis is processed for each area.

20. The device according to claim 19, wherein the image processor programming includes a code-specific decoding algorithm that can be applied to a resulting window of analysis.

21. The device according to claim 20, wherein the image processor programming is arranged so that the code-specific decoding algorithm seeks out respective code-specific start and stop symbols in the indicia pattern and determines intervening symbols by use of a code table.

22. A method for identifying a plate having an indicia pattern disposed on a predetermined region of the plate, the method comprising:

providing a camera with an image reader and optics for imaging the plate;

connecting an image processor to the camera for analyzing images from the camera;

taking with the camera a first image of the predetermined region;

taking with the camera a second image of the predetermined region; and analyzing with the image processor the first and second images for determining an identification code embodied by the indicia pattern.

23. The method according to claim 22, wherein the first image and the second image are taken alternately relative to each other.

24. The method according to claim 22, further comprising moving the plate relative to the camera between taking the first image and taking the second image.

25. The method according to claim 22, wherein the first image is of a first section of the predetermined region, and the second image is of a second section of the predetermined region.

26. The method according to claim 25, wherein the first section has part of the indicia pattern disposed thereon, and the second section has a different part of the indicia pattern disposed thereon.

27. The method according to claim 26, wherein the first section and the second section overlap.

28. The method according to claim 22, wherein analyzing comprises processing the first and second images for candidates for an expected identification code until a specific code can be analyzed, wherein, depending on a position of indicia in the indicia pattern, an expected overlap of indicia in the first and second images is calculated from predetermined imaging ratios, and an actual overlap is determined through comparing of indicia profiles on the first and second images.

29. The method according to claim 28, wherein analyzing comprises, if an actual overlap is determined, forming a weighted combination of the indicia profiles so that a continuous area of analysis is provided, but when no actual overlap is recognized, individually analyzing the indicia profiles in the first and second images.

30. The method according to claim 22, wherein taking the first image comprises imaging onto the image reader different sections of the predetermined region so that the first image is a composite image of different partial images.

31. The method according to claim 30, wherein taking the second image comprises imaging onto the image reader other different sections of the predetermined region so that the second image is another composite image of other different partial images.

* * * * *